United States Patent
Kobayashi

(10) Patent No.: US 7,528,913 B2
(45) Date of Patent: May 5, 2009

(54) LIQUID CRYSTAL DISPLAY DEVICE WHICH CAN CONTROL VIEWING ANGLE AND ELECTRONIC DEVICE USING SAME

(75) Inventor: Kunpei Kobayashi, Tachikawa (JP)

(73) Assignee: Casio Computer Co., Ltd., Tokyo (JP)

( * ) Notice: Subject to any disclaimer, the term of this patent is extended or adjusted under 35 U.S.C. 154(b) by 302 days.

(21) Appl. No.: 11/454,430

(22) Filed: Jun. 15, 2006

(65) Prior Publication Data

US 2006/0285040 A1    Dec. 21, 2006

(30) Foreign Application Priority Data

Jun. 17, 2005    (JP)    ............... 2005-177927

(51) Int. Cl.
G02F 1/1335    (2006.01)
G02F 1/1337    (2006.01)
(52) U.S. Cl. ............... 349/117; 349/123
(58) Field of Classification Search ............... None
See application file for complete search history.

(56) References Cited

U.S. PATENT DOCUMENTS

| | | | |
|---|---|---|---|
| 2005/0190329 A1* | 9/2005 | Okumura | 349/123 |
| 2005/0206814 A1* | 9/2005 | Histake | 349/112 |
| 2006/0066794 A1* | 3/2006 | Hotta et al. | 349/129 |
| 2006/0103782 A1* | 5/2006 | Adachi et al. | 349/96 |
| 2006/0145976 A1* | 7/2006 | Tsai et al. | 345/87 |
| 2006/0158590 A1* | 7/2006 | Matsushima | 349/117 |
| 2007/0002230 A1* | 1/2007 | Jang et al. | 349/117 |

FOREIGN PATENT DOCUMENTS

JP    2004-133334 A    4/2004

* cited by examiner

*Primary Examiner*—Michelle R Connelly Cushwa
(74) *Attorney, Agent, or Firm*—Frishauf, Holtz, Goodman & Chick, P.C.

(57) ABSTRACT

A liquid crystal display device, including image display panel having two polarizing plates, has a viewing-angle control panel on the outer surface side of the observation side polarizing plate, and a viewing-angle control polarizing plate disposed outside the viewing-angle control panel so as to arrange its transmission axis in parallel to the transmission axis of the polarizing plate. The viewing-angle control panel has electrodes provided on inner surfaces of a pair of substrates so as to oppose to each other, and a liquid crystal layer sealed between the substrates and having liquid crystal molecules aligned in uniform aligning state. The liquid crystal layer is at a value of retardation, which gives a phase difference of an integral multiple of ½ wavelength to oblique transmitted light inclined at predetermined angle to a normal of the substrate surface when voltage for aligning molecules in a direction inclined to the normal is applied.

20 Claims, 5 Drawing Sheets

LIQUID CRYSTAL DISPLAY DEVICE WHICH CAN CONTROL VIEWING ANGLE AND ELECTRONIC DEVICE USING SAME

BACKGROUND OF THE INVENTION

1. Field of the Invention

The present invention relates to a liquid crystal display device which can control the viewing angle of a display image to a wide viewing angle and a narrow viewing angle, and an electronic device using the same.

2. Description of the Related Art

Conventionally known as a viewing-angle limiting type display device which can limit a viewing angle is a liquid crystal display device which has an image display panel comprising a liquid crystal display panel, and a viewing-angle limiting element disposed over one side of the image display panel.

As disclosed in Unexamined Japanese Patent Application KOKAI Publication No. 2004-133334, the viewing-angle limiting element is provided with aligning films and electrodes. The aligning films are provided on the inner surfaces of a pair of substrates opposite to each other with a gap therebetween, and each has different directions of an aligning treatment for different segment regions provided by dividing an area of the image display panel corresponding to the screen thereof. The electrodes are provided on both of the opposing inner surfaces of the pair of substrates, and formed in such a predetermined pattern as to correspond to the individual segment regions. The liquid crystal molecules of a liquid crystal layer of the viewing-angle limiting element sealed between the pair of substrates are aligned in an aligning state which has a viewing angle in a direction inclined in one direction with respect to the normal line direction of the image display panel, and an aligning state which has a viewing angle in a direction inclined opposite to the former direction, for each segment region.

This viewing-angle limiting type liquid crystal display device applies a voltage between the electrodes of the viewing-angle limiting element and reduces a visibility from an oblique direction, thereby limiting the viewing angle of a display image on the image display panel. When no voltage is applied between the electrodes of the viewing-angle limiting element, i.e., when the viewing-angle limiting element is not in operation, the display image on the image display panel is viewed at a wide viewing angle. In contrast, when the voltage is applied between the electrodes of the viewing-angle limiting element, the display image of the viewing-angle limiting element appears as a display of each segment region having a viewing angle in a direction inclined in one direction of the viewing-angle limiting element and another display of other individual segment regions having a viewing angle in a direction inclined in the opposite direction. Accordingly, when viewed from a direction inclined in one direction with respect to the normal line direction of the image display panel and a direction inclined in the opposite direction, the display image on the image display panel is displayed partially hidden in accordance with each segment region of the viewing-angle limiting element, and cannot therefore be recognized entirely, so that the viewing angle of the display image is limited.

However, the conventional viewing-angle limiting type liquid crystal display device requires a complex aligning treatment (rubbing treatment for aligning films) on the inner surfaces of the pair of substrates of the viewing-angle limiting element which has different directions for different segment regions for aligning the liquid crystal molecules of the liquid crystal layer of the viewing-angle limiting element in different aligning states in such a way that the liquid crystal molecules have different viewing-angles for individual segment regions. This raises a problem that its manufacture is difficult.

SUMMARY OF THE INVENTION

An object of the invention is to provide a variable viewing angle liquid crystal display device which can control the viewing angle of a display image to a wide viewing angle and a narrow viewing angle.

Another object of the invention is to provide a variable viewing angle liquid crystal display device which has a simple structure and facilitates manufacturing.

It is a further object of the invention to provide an electronic device which uses a viewing angle variable liquid crystal display device.

To achieve the objects, a liquid crystal display device according to the first aspect of the invention comprises:
  an image display panel which has
    a view-side substrate and an opposite-side substrate facing each other with a gap therebetween,
    first and second electrodes provided on at least one of opposing inner surfaces of the view-side substrate and the opposite-side substrate, and forming a plurality of pixels,
    a liquid crystal layer sealed between the view-side substrate and the opposite-side substrate, and
    a pair of polarizing plates disposed in such a manner as to sandwich the view-side substrate and the opposite-side substrate, and
  controls light transmission for each of the plurality of pixels by applying a voltage according to image data between the first and second electrodes to display an image; and
  a viewing-angle control panel which has
    a liquid crystal element comprising a pair of substrates disposed on an external surface side of one of the polarizing plates of the image display panel and facing each other with a gap therebetween,
    electrodes respectively provided on opposing inner surfaces of the substrates so that the electrode, and
    a liquid crystal layer which is sealed between the pair of substrates, has liquid crystal molecules aligned in a uniform aligning state, and gives a retardation that is an integral multiple of a substantially ½ wavelength to an oblique transmitted light in a direction inclined at a predetermined angle with respect to a normal line of a surface of at least the substrate, when a voltage for aligning the liquid crystal molecules of the liquid crystal layer in a direction inclined obliquely with respect to the normal line at a predetermined angle is applied between the electrodes; and
  a viewing-angle control polarizing plate disposed outside the liquid crystal element in such a way that an optical axis of the viewing-angle control polarizing plate is directed in a direction parallel to optical axes of the polarizing plates of the image display panel.

According to the liquid crystal display device of the first aspect of the invention, it is possible to control the viewing angle of a display image displayed by the image display panel to a wide viewing angle and a narrow viewing angle.

In the liquid crystal display device of the invention, it is preferable that each of the electrodes on the inner surfaces of the pair of substrates of the viewing-angle control panel should be a single-film electrode corresponding to an entire region of a screen at which the plurality of pixels of the image display panel are arrayed.

In the liquid crystal display device of the invention, it is preferable that the viewing-angle control panel should further have a homeotropic alignment type liquid crystal element which has the liquid crystal molecules of the liquid crystal layer aligned substantially vertical to the surface of at least the substrate between the pair of substrate, and each of the inner surfaces of the pair of substrates having the electrodes provided thereon should be subjected to an aligning treatment which prescribes a falling direction of the liquid crystal molecules when a voltage is applied between the electrodes in a direction parallel to the optical axes of one of the polarizing plates of the image display panel and the viewing-angle control polarizing plate. In this case, it is desirable that a homeotropic aligning film for aligning the liquid crystal molecules substantially vertical to the surface of at least the substrate between the pair of substrates should be formed on each of the inner surfaces of the pair of substrates of the viewing-angle control panel which have the electrode provided thereon. It is further preferable that the homeotropic aligning film should be subjected to an aligning treatment in a direction substantially parallel to a vertical direction of a screen at which the plurality of pixels of the image display panel are arrayed.

In the liquid crystal display device of the invention, it is preferable that the viewing-angle control panel should further have a homogeneous alignment type liquid crystal element which has the liquid crystal molecules of the liquid crystal layer untwisted and aligned substantially parallel to the surface of at least the substrate between the pair of substrates, and each of the inner surfaces of the pair of substrates having the electrodes provided thereon should be subjected to an aligning treatment which has the liquid crystal molecules aligned substantially parallel to the optical axes of one of the polarizing plates of the image display panel and the viewing-angle control polarizing plate. In this case, it is desirable that a homogeneous aligning film for aligning the liquid crystal molecules substantially parallel to the surface of at least the substrate between the pair of substrates should be formed on each of the inner surfaces of the pair of substrates of the viewing-angle control panel which have the electrodes provided thereon. It is further preferable that the homogeneous aligning film should be subjected to an aligning treatment in a direction substantially parallel to a vertical direction of a screen at which the plurality of pixels of the image display panel are arrayed.

Further, in the liquid crystal display device of the invention, it is preferable that the viewing-angle control panel should have another viewing-angle control polarizing plate disposed between one of the polarizing plate of the image display panel and the viewing-angle control panel in such a way that a transmission axis of the another viewing-angle control polarizing plate is in parallel to the optical axis of the one of the polarizing plates of the image display panel. It is preferable that the inner surfaces of the pair of substrates of the viewing-angle control panel should be subjected to an aligning treatment in a direction substantially parallel to a vertical direction of a screen at which the plurality of pixels of the image display panel are arrayed.

In the liquid crystal display device of the invention, it is preferable that the viewing-angle control panel should have a liquid crystal layer which gives the retardation that is an integral multiple of a substantially ½ wavelength to an oblique transmitted light in a direction inclined at an angle of 30° to 60° with respect to the normal line when the voltage for aligning the liquid crystal molecules of the liquid crystal layer in a direction inclined obliquely with respect to the normal line at the predetermined angle is applied between the electrodes. It is further preferable that the viewing-angle control panel should have a liquid crystal layer which gives the retardation that is an integral multiple of a substantially ½ wavelength to an oblique transmitted light in a direction inclined at an angle of substantially 45° with respect to the normal line when a voltage for aligning the liquid crystal molecules of the liquid crystal layer in a direction inclined obliquely with respect to the normal line at an angle of 45° is applied between the electrodes.

A liquid crystal display device according to the second aspect of the invention comprises:
  an image display panel which comprises
    a view-side substrate and an opposite-side substrate facing each other with a gap therebetween,
    first and second electrodes provided on at least one of opposing inner surfaces of the view-side substrate and the opposite-side substrate forming a plurality of pixels,
    a liquid crystal layer sealed between the view-side substrate and the opposite-side substrate, and
    a pair of polarizing plates disposed in such a manner as to sandwich the view-side substrate and the opposite-side substrate, and
  controls light transmission for each of the plurality of pixels by applying a voltage according to image data between the first and second electrodes to display an image;
  a viewing-angle control panel which has
    a liquid crystal element which comprises a pair of substrates disposed on an external surface side of one of the polarizing plates of the image display panel and acing each other with a gap therebetween,
    electrodes respectively provided on opposing inner surfaces of the substrates, and
    a liquid crystal layer which is sealed between the pair of substrates, has liquid crystal molecules aligned in a uniform aligning state, and gives a retardation that is an integral multiple of a ½ wavelength to an oblique transmitted light in a direction inclined at a predetermined angle with respect to a normal line of a surface of at least the substrate, when a voltage for aligning the liquid crystal molecules of the liquid crystal layer in a direction inclined obliquely with respect to the normal line at a predetermined angle is applied between the electrodes; and
    a viewing-angle control polarizing plate disposed outside the liquid crystal element in such a way that an optical axis of the viewing-angle control polarizing plate is directed in a direction parallel to optical axes of the polarizing plates of the image display panel; and
  a viewing-angle control circuit which is connected to the viewing-angle control panel, and supplies a voltage for aligning liquid crystal molecules of the liquid crystal layer in a direction inclined obliquely with respect to the normal line between the electrodes of the viewing-angle control panel.

According to the liquid crystal display device of the second aspect of the invention, it is possible to control the viewing angle of a display image displayed by the image display panel to a wide viewing angle and a narrow viewing angle.

It is preferable that the liquid crystal display device should further comprise a display drive circuit which drives the image display panel, and a control circuit to which a display data signal and a viewing angle selection signal are supplied, and which controls the display drive circuit, and operation of the viewing-angle control circuit in accordance with the viewing angle selection signal.

In the liquid crystal display device of the invention, it is preferable that the viewing-angle control panel should have a liquid crystal layer which gives the retardation that is an integral multiple of a substantially ½ wavelength to an oblique transmitted light in a direction inclined at an angle of 30° to 60° with respect to the normal line when a voltage for aligning the liquid crystal molecules of the liquid crystal layer in a direction inclined obliquely with respect to the normal line at an angle of 45° is applied between the electrodes.

In the liquid crystal display device of the invention, it is preferable that the viewing-angle control panel should have a homeotropic aligning film formed for having the liquid crystal molecules aligned substantially vertical to the surface of the substrate between the pair of substrate on each of the inner surfaces of the pair of substrates which have the electrode provided thereon, and the homeotropic aligning film is subjected to an aligning treatment which prescribes a falling direction of the liquid crystal molecules when a voltage is applied between the electrodes in a direction parallel to the optical axes of one of the polarizing plates of the image display panel and the viewing-angle control polarizing plate. Or, it is desirable that the viewing-angle control panel should have a homogeneous aligning film formed for having the liquid crystal molecules aligned substantially parallel to the surface of the substrate between the pair of substrate on each of the inner surfaces of the pair of substrates having the electrode provided thereon, and the homogeneous aligning film is subjected to an aligning treatment which prescribes a falling direction of the liquid crystal molecules when a voltage is applied between the electrodes in a direction parallel to the optical axes of one of the polarizing plates of the image display panel and the viewing-angle control polarizing plate.

An electronic device according to the third aspect of the invention comprises:
   an image display panel which has
      a view-side substrate and an opposite-side substrate facing each other with a gap therebetween,
      first and second electrodes provided on at least one of opposing inner surfaces of the view-side substrate and the opposite-side substrate forming a plurality of pixels,
      a liquid crystal layer sealed between the view-side substrate and the opposite-side substrate, and
      a pair of polarizing plates disposed in such a manner as to sandwich the view-side substrate and the opposite-side substrate, and
      controls light transmission for each of the plurality of pixels by applying a voltage according to image data between the first and second electrodes to display an image;
   a viewing-angle control panel which has
      a liquid crystal element having a pair of substrates disposed on an external surface side of one of the polarizing plates of the image display panel and facing each other with a gap therebetween,
      electrodes provided on both inner surfaces of the substrates, and
      a liquid crystal layer which is sealed between the pair of substrates, has liquid crystal molecules aligned in a uniform aligning state, and gives a retardation that is an integral multiple of a ½ wavelength to an oblique transmitted light in a direction inclined at a predetermined angle with respect to a normal line of a surface of at least the substrate, when a voltage for aligning the liquid crystal molecules of the liquid crystal layer in a direction inclined obliquely with respect to the normal line at a predetermined angle is applied between the electrodes; and
   a viewing-angle control polarizing plate disposed outside the liquid crystal element in such a way that an optical axis of the viewing-angle control polarizing plate is directed in a direction parallel to optical axes of the polarizing plates of the image display panel.

According to the electronic device of the third aspect of the invention, in using the electronic device, it is possible to control the viewing angle of a display image displayed by the image display panel to a wide viewing angle and a narrow viewing angle.

In the electronic device, it is preferable that the liquid crystal display panel should be arranged in accordance with a display section of the electronic device, and the inner surfaces of the pair of substrates of the viewing-angle control panel of the liquid crystal display device having the electrodes provided thereon should be subjected to an aligning treatment in a direction substantially parallel to a vertical direction in a use state of the electronic device. Further, it is desirable that the electronic device should further comprise a viewing-angle control circuit which is connected to the viewing-angle control panel, and supplies a voltage for aligning the liquid crystal molecules of the liquid crystal layer in a direction inclined obliquely to the normal line between the electrodes of the viewing-angle control panel, and a viewing angle selection section which supplies a viewing angle selection signal for having the viewing-angle control circuit select a wide viewing angle and narrow viewing angle.

BRIEF DESCRIPTION OF THE DRAWINGS

These objects and other objects and advantages of the present invention will become more apparent upon reading of the following detailed description and the accompanying drawings in which.

DETAILED DESCRIPTION OF THE PREFERRED EMBODIMENTS

Liquid crystal display devices will be described below as embodiments of the present invention with reference to the accompanying drawings.

First Embodiment

Figure 1:
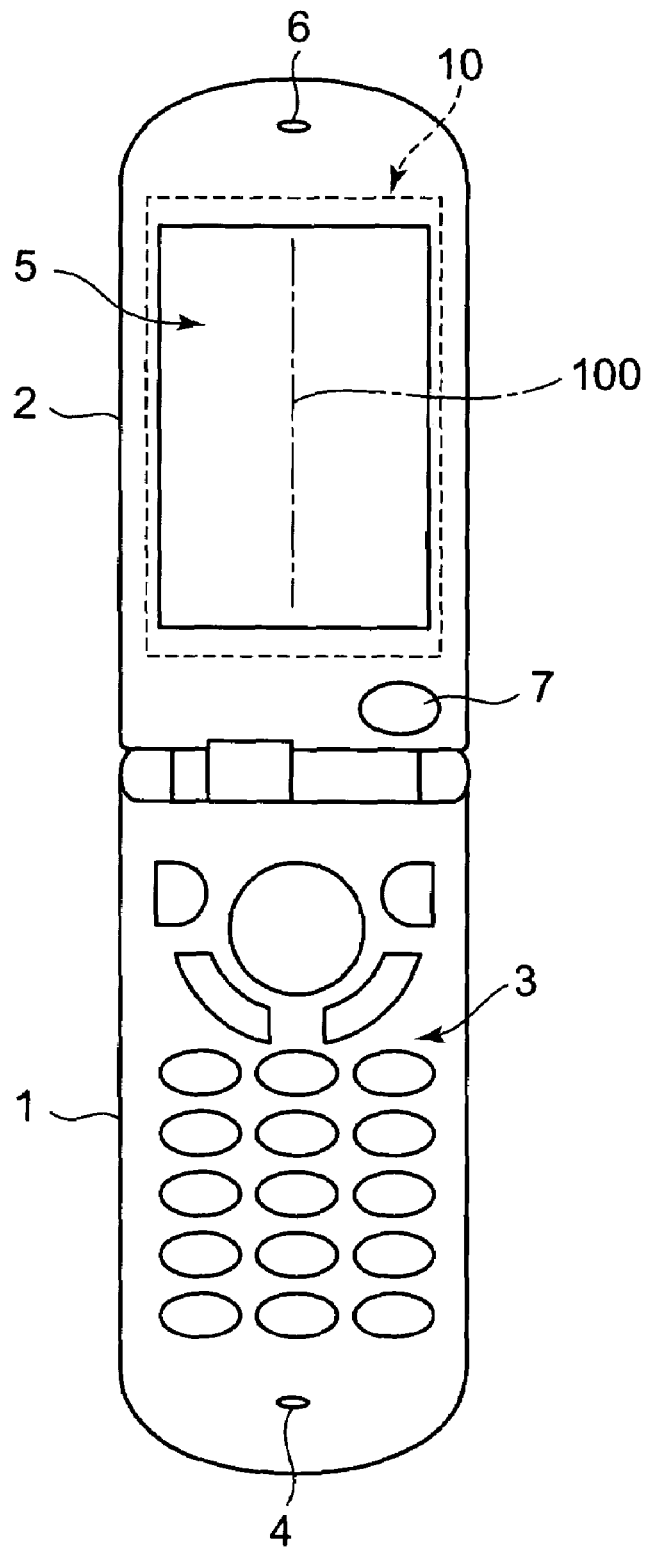
FIG. 1 is a front view illustrating an electronic device having a liquid crystal display device according to the first embodiment of the invention.
Figure 2:
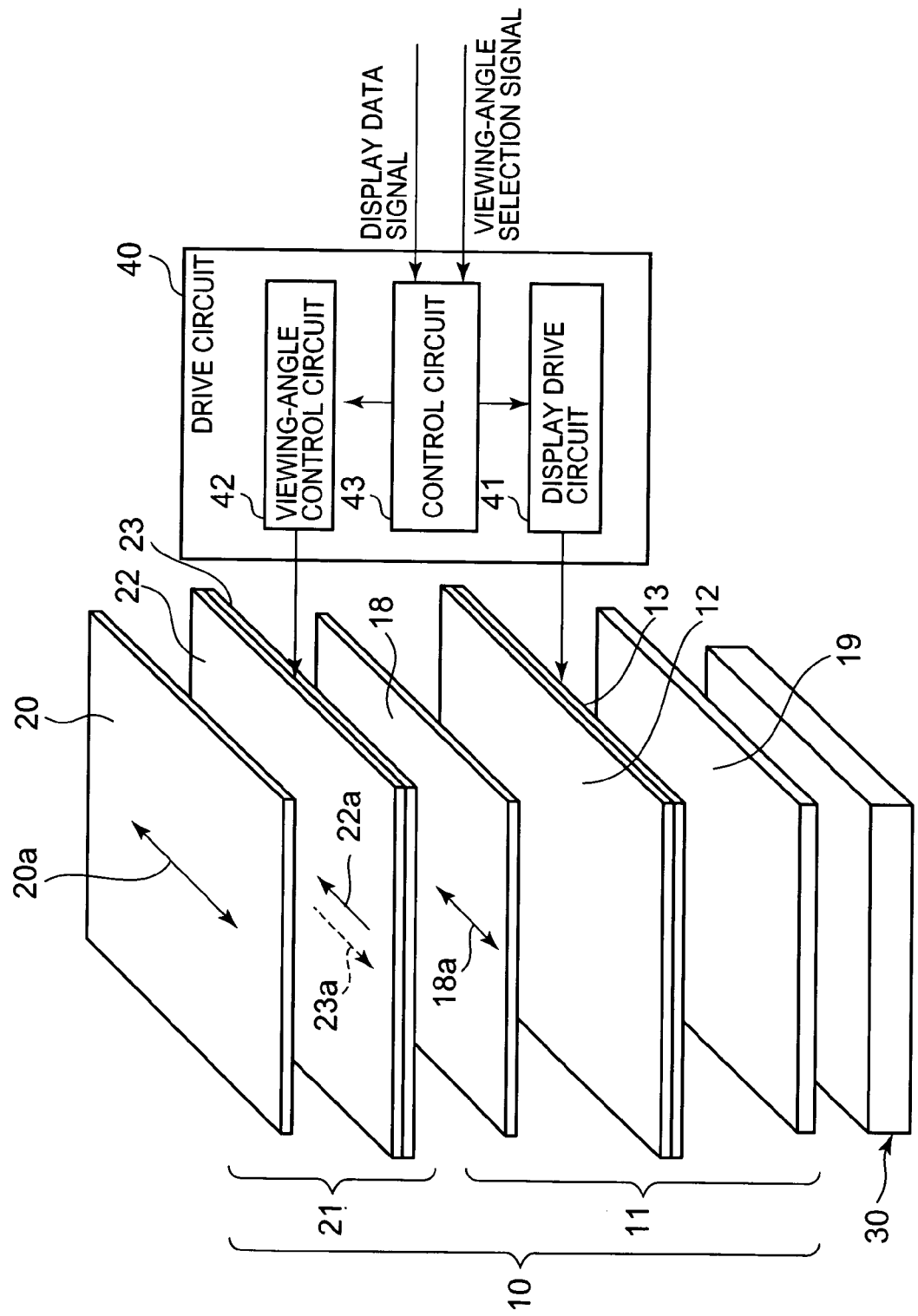
FIG. 2 is an exploded view illustrating the structure of the liquid crystal display device of the first embodiment of the invention.
Figure 3:
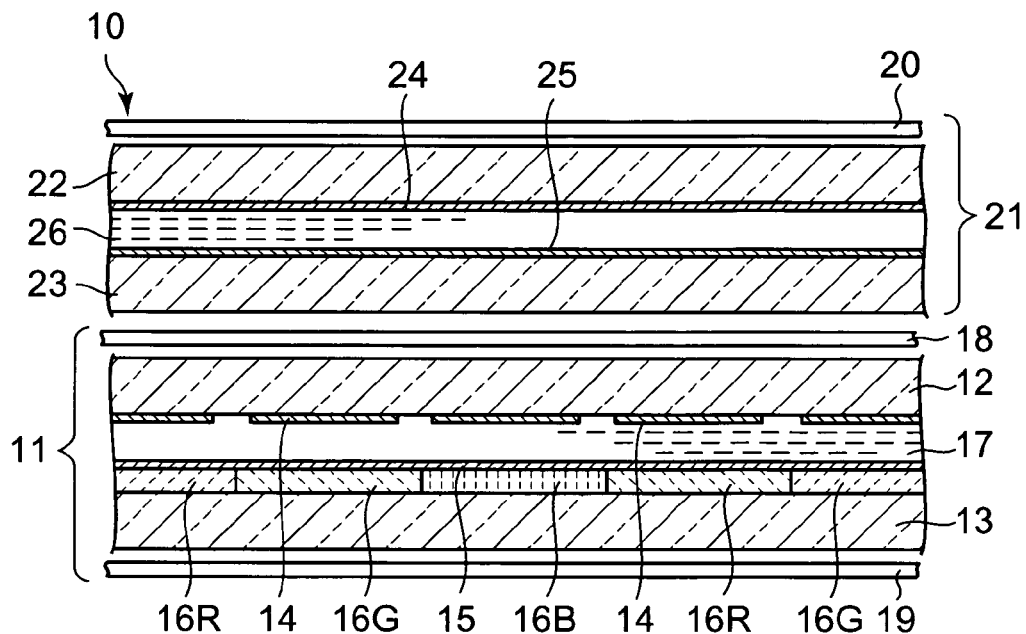
FIG. 3 is a cross-sectional view illustrating a part of the liquid crystal display device in FIG. 1 enlarged.

FIGS. 1 to 6 illustrate the first embodiment of the invention. FIG. 1 is a front view of an electronic device having a liquid crystal display device, FIG. 2 is an exploded view illustrating the structure of a liquid crystal display device according to the first embodiment of the invention, and FIG. 3 is a cross-sectional view of a part of the liquid crystal display device.

The electronic device illustrated in FIG. 1 is a folding cellular phone device which comprises a phone main body 1, and a lid 2 whose base end is so supported by the end of the phone main body 1 as to be pivotable, and which is rotary opened and closed in such a manner as to be an open state where the lid 2 protrudes outward the phone main body 1, and a close state where the lid 2 is put on the phone main body 1. A keyboard section 3 and a microphone section 4 are provided on the front face of the phone main body 1 (overlapping surface of the lid 2). A display section 5 and a speaker section 6 are provided on the front face of the lid 2 (a surface that faces the front face of the phone main body 1 when folded). A liquid crystal display device 10 is disposed in the lid 2 in such a manner as to correspond to the display section 5, and a surface light source 30 is disposed behind the liquid crystal display device 10.

The liquid crystal display device 10 is viewing-angle control type which can change an angle between the direction of the normal line of the liquid crystal display device 10 and an oblique direction where a display becomes unviewable when an observation direction is inclined with respect to the normal line (this angle is hereinafter called viewing angle). As illustrated in FIGS. 2 and 3, the liquid crystal display device 10 has an image display panel 11 comprising a transparent type liquid crystal display panel, and a viewing-angle control panel 21 disposed on one surface side of the image display panel 11, for example, an observation side. The viewing-angle control panel 21 has a viewing-angle control polarizing plate 20 disposed on the observation side. The liquid crystal display device 10 and the viewing-angle control panel 21 are both driven by a drive circuit 40 having a display drive circuit 41, a viewing-angle control circuit 42, and a control circuit 43 which controls the operations of those circuits.

The image display panel 11 comprises a transparent view-side substrate 12 and an opposite-side substrate 13 joined with each other via non-illustrated frame-like seal member, and facing each other with a gap therebetween, a liquid crystal layer 17 sealed between the view-side substrate 12 and the opposite-side substrate 13, and a pair of polarizing plates 18, 19 disposed in such a manner as to sandwich the view-side substrate 12 and the opposite-side substrate 13. Formed on either one of the opposing inner surfaces of the pair of substrates 12, 13 are a plurality of first transparent electrode 14 for forming a plurality of pixels arrayed in a matrix by regions facing each other, and at least one second transparent electrode 15. Light transmission is controlled for each of the plurality of pixels by a voltage according to image data applied between the first and second electrodes 14, 15, thereby displaying an image.

The image display panel 11 is an active matrix liquid crystal display panel which is provided with the plurality of pixel electrode 14 on the inner surface of one substrate, for example, a view-side substrate 12 arrayed in a matrix in a row direction and a column direction, and a single-film counter electrode 15 on the inner surface of the other substrate, i.e., the opposite-side substrate 13 facing a region where the plurality of pixel electrode 14 are arrayed. It is omitted in FIG. 3, but an active element which comprises TFTs (Thin Film Transistor) each connected to each of the plurality of pixel electrode 14, a plurality of gate lines each of which supplies a gate signal to the TFT of each row, and a plurality of data lines each of which supplies a data signal to the TFT of each column is provided.

The image display panel 11 has three colors of red, green, and blue color filters 16R, 16B, and 16G each corresponding to the plurality of pixels defined by regions where the plurality of pixel electrode 14 and the counter electrode 15 face with each other. Those color filters 16R, 16G, and 16B are formed on, for example, the substrate 13 opposite to the view-side substrate 12, and the counter electrode 15 is formed over those filters.

The inner surfaces of the view-side substrate 12 and opposite-side substrate 13 are subjected to aligning treatments by rubbing non-illustrated homogeneous aligning films provided in such a manner as to cover the electrodes 14, 15. The liquid crystal molecules of the liquid crystal layer 17 are aligned in an aligning state defined by the aligning treatments of those inner substrates between the view-side substrate 12 and the opposite-side substrate 13.

The type of the image display panel 11 may be any one of a TN or STN type that the liquid crystal molecules are twist aligned between the substrates 12, 13, a homeotropic alignment type that the liquid crystal molecules are aligned substantially vertical to the substrates 12, 13 between the substrates 12, 13, a homogeneous alignment type that the liquid crystal molecules are aligned substantially parallel to the substrates 12,13 without twisting them between the substrates 12, 13, or a bend alignment type that the liquid crystal molecules are bend aligned. The image display panel 11 may be a ferroelectric or antiferroelectric liquid crystal display panel. In any display panels, the pair of polarizing plates 18, 19 are disposed in such a way that the optical axis (transmission axis or absorption axis) of the polarizing plate 18 on the observation side which is the side that the viewing-angle control panel 21 and the viewing-angle control polarizing plate 20 are disposed becomes substantially in parallel to the vertical direction of a screen at which the pixels of the image display panel 11 are arrayed, and the directions of both transmission axes of the pair of polarizing plates 18, 19 are set to obtain a good contrast characteristic.

The image display panel 11 of the embodiment is a vertical electric field control type which provides the first and second electrodes 14, 15 forming the plurality of pixels on the inner surfaces of the view-side substrate 12 and opposite-side substrate 13, applies a voltage according to image data between those electrodes 14, 15, generates a vertical electric field (electric field in the thickness direction of the liquid crystal layer 17) between the electrodes 14, 15, and changes the aligning states of the liquid crystal molecules.

In the invention, however, the image display panel 11 may be a transverse electric field control type which provides, for example, a tooth-of-comb-like first electrode and second electrode which forms a plurality of pixels on any of the inner surfaces of the view-side substrate 12 and opposite-side substrate 13, applies a voltage according to image data between those electrodes, generates a transverse electric field (electric field in a direction along the surface of the substrate) between the electrodes, and changes the aligning states of the liquid crystal molecules. In this case, the pair of polarizing plates 18, 19 are disposed in such a way that the optical axis (transmission axis or absorption axis) of the polarizing plate on the side that the viewing-angle control panel 21 and the viewing-angle control polarizing plate 20 are disposed becomes in parallel to the vertical direction of the screen, and the directions of both transmission axes of the pair of polarizing plates are set as to obtain a good contrast characteristic.

Further, the image display panel 11 may be a normally-white mode display panel, or a normally-black mode display panel.

The viewing-angle control polarizing plate 20 is disposed on the outer surface side of the polarizing plate 18 on the observation side of the image display panel 11 in such a manner as to set the transmission axis of the viewing-angle control polarizing plate 20 to a direction parallel to the transmission axis of the observation side polarizing plate 18, and the viewing-angle control panel 21 is disposed between the observation side polarizing plate 18 of the image display panel 11 and the viewing-angle control polarizing plate 20.

The viewing-angle control panel 21 comprises a pair of transparent substrates 22, 23 joined with each other through a non-illustrated frame-like seal member and facing each other with a gap therebetween, transparent electrodes 24, 25 provided on the respective opposing inner surfaces of the substrates 22, 23 so as to face each other, and a liquid crystal layer 26 sealed between the pair of substrates 22, 23, and whose liquid crystal molecules are aligned in a uniform aligning state. The optical characteristic of the liquid crystal layer is set in such a manner as to give a retardation that is an integral multiple of a substantially ½ wavelength (approximately around 275 nm which is a ½ of the intermediate wavelength of a visible light bandwidth) to a light obliquely transmitting in a direction inclined at a predetermined direction (30° to 60°, preferably 45°) with respect to the normal line of the substrates 22, 23 when a voltage which has the liquid crystal molecules of the liquid crystal layer 26 aligned obliquely with respect to the normal line of the surfaces of the substrates 22, 23 at a predetermined angle (preferably, 45°) is applied between the electrodes 24, 25.

In the embodiment, each of the electrodes 24, 25 on the inner surfaces of the pair of substrates 22, 23 of the viewing-angle control panel 21 is formed in a piece of sheet like shape which corresponds to the entire area of the screen at which the pixels of the image display panel 11 are arrayed.

The viewing-angle control panel 21 comprises a homeotropic alignment type liquid crystal element which has the liquid crystal molecules of the liquid crystal layer 26 aligned substantially vertical to the surfaces of the substrates 22, 23 between the pair of substrates 22, 23, and the product Δnd of an anisotropy refractive index Δn of the liquid crystal and the thickness d of the liquid crystal layer is set within the range of 300 nm to 1000 nm.

The inner surfaces of the pair of substrates 22, 23 of the viewing-angle control panel 21 having the electrodes 24, 25 provided thereon are subjected to an aligning treatment which prescribes a falling direction of the liquid crystal molecules when a voltage is applied between the electrodes 24, 25 in a direction parallel to the optical axes (transmission axes or absorption axes) of the observation side polarizing plate 18 and the viewing-angle control polarizing plate 20 of the image display panel 11.

It is omitted in FIG. 3, but homeotropic aligning films which covers the electrodes 24, 25 are provided on the respective inner surfaces of the pair of substrates 22, 23 of the viewing-angle control panel 21, and the inner surfaces of those substrates 22, 23 are subjected to an aligning treatment by rubbing those aligning films in one direction.

Figure 4:
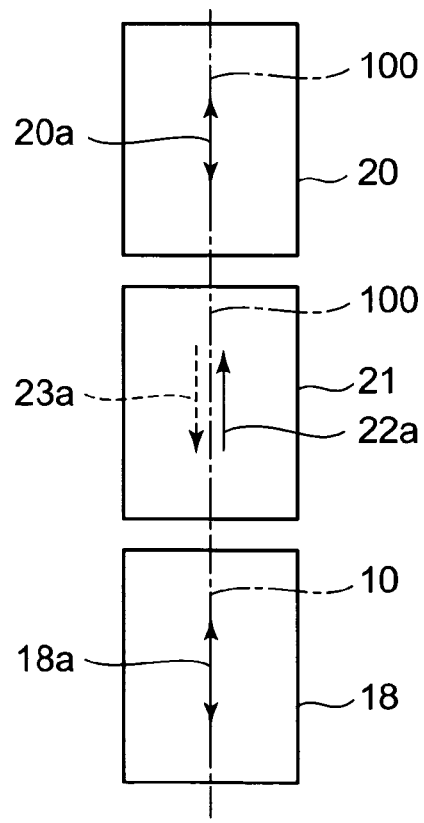
FIG. 4 is a diagram illustrating the transmission axis of an observation side polarizing plate of an image display panel, a direction of the transmission axis of a polarizing plate disposed on the observation side of a viewing-angle control panel, and the aligning treatment directions of a pair of substrates of the viewing-angle control panel in the liquid crystal display device.

FIG. 4 illustrates the direction of the transmission axis of the observation side polarizing plate 18 and the transmission axis of the viewing-angle control polarizing plate 20 of the image display panel 11, and the aligning treatment directions of the pair of substrates 22, 23 of the viewing-angle control panel 21.

In FIG. 4, arrows 22*a*, 23*a* indicate the aligning treatment directions of the pair of substrates 22, 23 of the viewing-angle control panel 21. The one substrate 22 and the other substrate 23 of the viewing-angle control panel 21 are subjected to aligning treatments in a direction substantially parallel to the vertical direction 100 of screen of the image display panel 11 (vertical axis of the screen) and in directions opposite to each other. That is, in a case where the liquid crystal display device 10 is attached to the display section 5 of the electronic device, the one substrate 22 and the other substrate 23 of the viewing-angle control panel 21 are subjected to an aligning treatment in a direction substantially parallel to the vertical direction 100 of the electronic device, and the transmission axis of the viewing-angle control polarizing plate 20 is disposed in parallel to the vertical direction with the electronic device being in a normally use mode.

In this embodiment, the one substrate 22 of the viewing-angle control panel 21 is subjected to an aligning treatment from downward the screen to upward thereof, and the other substrate 23 is subjected to an aligning treatment from upward the screen to downward thereof, but in contradiction to this case, the one substrate 22 may be subjected to the aligning treatment from upward the screen to downward thereof, and the other substrate 23 may be subjected to the aligning treatment from downward the screen to upward thereof.

In the embodiment, as illustrated in FIG. 4, the viewing-angle control polarizing plate 20 is disposed in such a way that a transmission axis 20*a* of the viewing-angle control polarizing plate 20 is directed in a direction substantially parallel to a vertical direction 100 of the screen, a transmission axis 18*a* of the observation side polarizing plate 18 of the image display panel 11 is directed in a direction substantially parallel to the direction of the transmission axis 20*a* of the viewing-angle control polarizing plate 20, and the directions of the aligning treatments of the pair of substrates 22, 23 of the viewing-angle control panel 21 is directed in a direction substantially parallel to the direction of the transmission axis 20*a* of the viewing-angle control polarizing plate 20. That is, the direction of the transmission axis 20*a* of the viewing-angle control polarizing plate 20, the directions of the aligning treatments of the pair of substrates 22, 23 of the viewing-angle control panel 21, and the transmission axis 18*a* of the observation side polarizing plate 18 of the image display panel 11 are all directed in a direction substantially parallel to the vertical direction 100 of the screen.

As illustrated in FIG. 2, the image display panel 11 is connected to the display drive circuit 41 which applies a voltage according to image data between the electrodes 14, 15 of each pixel of the image display panel 11, and the viewing-angle control panel 21 is connected to the viewing-angle control circuit 42 which applies a voltage between the electrodes 24, 25 for aligning the liquid crystal molecules in a direction inclined obliquely with respect to the normal line of the surfaces of the substrates 22, 23.

The viewing-angle control circuit 42 is structured in such a manner as not to apply the voltage between the electrodes 24, 25 of the viewing-angle control panel 21 when, for example, a wide viewing angle is selected through a viewing angle selection key 7 provided on the lid 2 or the phone main body 1 of the cellular phone device illustrated in FIG. 1, and as to apply a predetermined value of voltage between the electrodes 24, 25 when a narrow viewing angle is selected. The voltage is set in a value that the liquid crystal molecules aligned substantially vertical to the surfaces of the substrates 22, 23 are aligned and inclined at an angle of 30° to 60°, and preferably, substantially 45° with respect to the surfaces of the substrates 22, 23.

The liquid crystal display device 10 has the liquid crystal layer 17 sealed between the view-side substrate 12 and the opposite-side substrate 13 whose inner surfaces are provided with respective electrodes 14, 15 forming the plurality of pixels, the pair of polarizing plates 18, 19 disposed in such a manner as to sandwich the view-side substrate 12 and the opposite-side substrate 13, and the image display panel 11 which applies a voltage according to image data between the electrodes 14, 15 and controls light transmission for each pixel, and displays an image. The viewing-angle control panel 21 is disposed outside the observation side polarizing plate 18 in the pair of polarizing plates 18, 19. The viewing-angle control panel 21 comprises the pair of substrates 22, 23 facing each other with a gap therebetween, the electrodes 24, 25 provided on the respective inner surfaces of the pair of substrates 22, 23 and facing each other, and the liquid crystal layer 26 sealed between the pair of substrates 22, 23 and whose liquid crystal molecules are aligned in a uniform aligning state. When a voltage which has the liquid crystal molecules of the liquid crystal layer 26 aligned in a direction inclined obliquely with respect to the normal line of the surfaces of the substrates 22, 23 is applied between the electrodes 24, 25, the viewing-angle control panel 21 gives a retardation that is an integral multiple of a substantially ½ wavelength to an oblique transmitted light in a direction inclined obliquely with respect to the normal line at a predetermined angle (an angle of 30° to 60°, and preferably, 45°).

As the observation side viewing-angle control polarizing plate 20 of the viewing-angle control panel 21 is disposed in such a way that the transmission axis 20a of that plate becomes in parallel to the transmission axis 18a of the observation side polarizing plate 18 of the image display panel 11, the viewing angle of a display image on the image display panel 11 is controlled from a wide viewing angle to a narrow viewing angle by the application of the voltage between the electrodes 24, 25 of the viewing-angle control panel 21.

That is, the liquid crystal display device 10 allows a light from the surface light source 30 on the other surface side, i.e., the back surface side of the image display panel 11 (a side opposite to the side that the viewing-angle control polarizing plate 20 and the viewing-angle control panel 21 are disposed) to transmit and emerge, and controls the viewing angle of a display image on the image display panel 11 by a viewing-angle control system comprising the observation side polarizing plate 18 and the viewing-angle control polarizing plate 20 of the image display panel 11, and the viewing-angle control panel 21.

When the viewing-angle control panel 21 does not apply the voltage between the electrodes 24, 25, the liquid crystal display device 10 allows transmitted lights in most directions to transmit without giving a retardation, so that a display image on the image display panel 11 is observed from a wide angle range in accordance with the viewing angle characteristic of the image display panel 11.

On the other hand, when a voltage which has the liquid crystal molecules aligned in a direction inclined obliquely with respect to the normal line of the surfaces of the substrates 22, 23 is applied between the electrodes 24, 25, the viewing-angle control panel 21 gives a retardation (retardation that is an integral multiple of a ½ wavelength) to an oblique transmitted light of lights transmitting the viewing-angle control panel 21 which is in a direction inclined at a predetermined angle (in the liquid crystal display device, 45°) with respect to the normal line of the substrates 22, 23, and changes the polarization state. As the oblique transmitted light is absorbed by the viewing-angle control polarizing plate 20 disposed on the output side of the viewing-angle control panel 21, a display image is not recognized from a direction inclined obliquely with respect to the normal line of the surfaces of the substrates 12, 13 of the image display panel 11, and the viewing angle of the display image becomes narrow.

Figure 5:
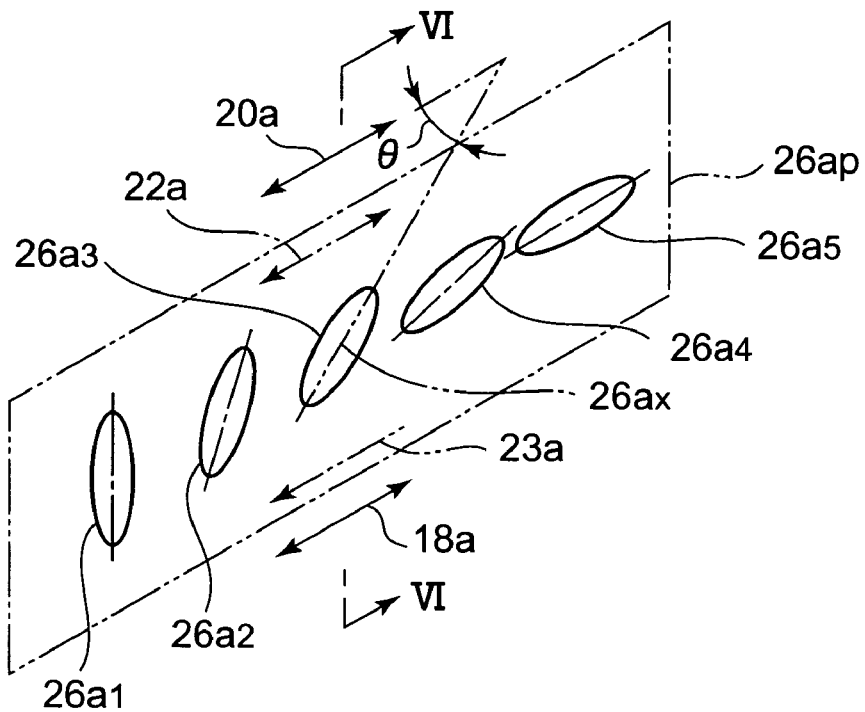
FIG. 5 is an exemplarily diagram illustrating the directions of molecular long axes at a time of applying a voltage and at a time of not applying a voltage to the viewing-angle control panel in a case where a homeotropic alignment type liquid crystal element is used as the viewing-angle control panel.
Figure 6:
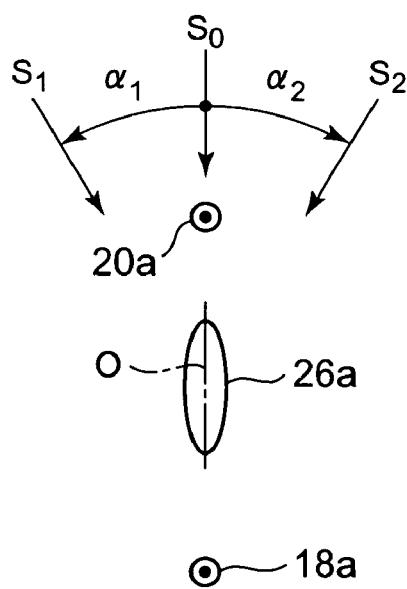
FIG. 6 is a cross-sectional view along a line VI-VI in FIG. 5.

The control of a viewing angle by the viewing-angle control system comprising the observation side polarizing plate 18 and the viewing-angle control polarizing plate 20 of the image display panel 11 and the viewing-angle control panel 21 will now be explained. FIG. 5 is a diagram exemplarily illustrating a relationship between the transmission axes 18a, 20a of the observation side polarizing plate 18 and the viewing-angle control polarizing plate 20 of the image display panel 11 and the molecular long axes of the liquid crystal molecules of the homeotropic alignment type viewing-angle control panel 21 at a time of applying a voltage and at a time of not applying a voltage. FIG. 6 is a cross-sectional view along a line VI-VI in FIG. 5. When no voltage is applied between the electrodes 24, 25, the liquid crystal molecules 26a of the viewing-angle control panel 21 are aligned substantially vertical to the surfaces of the substrates 22, 23 like a liquid crystal molecule 26a1 in FIG. 5. When a voltage is applied between the electrodes 24, 25, the liquid crystal molecules are aligned in such a way that the molecular long axes are directed in a direction parallel to the normal line of the viewing-angle control panel 21 (normal line of the surfaces of the substrates 22, 23) and in a direction along a vertical plane 26ap including aligning treatment directions 22a, 23a of the pair of substrates 22, 23 in accordance with the intensity of an electric filed applied to the liquid crystal layer, like liquid crystal molecules 26a2 to 26a5. As the applied voltage becomes large, the liquid crystal molecules are fell and aligned in such a way that the angle to the normal line of the surfaces of the substrates 22, 23 becomes wide.

In the viewing-angle control system, an angle θ that the molecular long axis 26ax of the liquid crystal molecule 26a of the viewing-angle control panel 21 crosses the transmission axes 18a, 20a of the polarizing plates 18, 20 (hereinafter, "crossing angle θ") changes depending on the observation direction of a display.

That is, in observing from a direction $S_0$ illustrated in FIG. 6, i.e., the direction of the normal line of the liquid crystal element 21 for the viewing-angle control panel (normal line of the surfaces of the substrates 22, 23) the crossing angle θ is always 0° regardless of the falling angle of the liquid crystal molecule 26a. In observing from directions $S_1$ and $S_2$ illustrated in FIG. 6, i.e., directions obliquely inclining to one surface side and other surface side of a vertical plane 26ap illustrated in FIG. 5, the wider the falling angle of the liquid crystal molecule 26a becomes and the wider the angle in observation directions becomes, the wider the crossing angle θ becomes.

With the transmission axis 18a of the observation side polarizing plate 18 of the image display panel 11 and the transmission axis 20a of the viewing-angle control polarizing plate 20 being in parallel to each other, provided that the crossing angle of the molecular long axis 26ax of the liquid crystal molecule 26a with respect to the transmission axes 18a, 20a of he polarizing plates 18, 20 is θ, and the product of an anisotropy refractive index Δn and the liquid crystal layer thickness d of the viewing-angle control panel 21 is Δnd, the intensity of a transmitted light of the viewing-angle control system can be expressed by the following equation.

$$I = 1 - I_0 \sin^2(\pi \Delta n d/\lambda) \sin^2(2\theta) \ldots \quad (1)$$

where $I_0$ is the intensity of an incoming light into the viewing-angle control system, and λ is the wavelength of the transmitted light As will be apparent from the equation (1), when observation is performed from the normal line direction $S_0$ of the viewing-angle control panel 21, i.e., when the crossing angle θ of the molecular long axis 26ax of the liquid crystal molecule 26a with respect to the transparent angles 18a, 20a of the polarizing plates 18, 20 is 0°, the intensity of the transmitted light of the viewing-angle control system is largest regardless of change in the aligning state of the liquid crystal molecule 26a of the viewing-angle control panel 21.

Therefore, in observing from the front direction of the liquid crystal display device 10, i.e., the direction $S_0$ adjacent to the normal line of the image display panel 11 and the viewing-angle control panel 21, when a voltage is applied and not applied between the electrodes 24, 25 of the viewing-angle control panel 21, the liquid crystal molecule 26a only changes the tilting angle to the substrate in the vertical plane 26ap, and the crossing angle θ of the molecular long axis 26ax of the liquid crystal molecule 26a with respect to the transmission axes 18a, 20a of the polarizing plates 18, 20 is 0° (parallel), and does not change. Accordingly, the intensity I of the transmitted light of the viewing-angle control system is kept in the largest intensity, and it is possible to view a display image on the image display panel 11 with high brightness and contrasts.

In contrast, in observing the liquid crystal display panel 10 from the directions $S_1$ and $S_2$ inclined obliquely in the front direction, when no voltage is applied between the electrodes 24, 25 of the viewing-angle control panel 21, the liquid crystal molecule 26a is aligned vertical to the surface of the substrate, and the crossing angle θ of the molecular long axis 26ax of the liquid crystal molecule 26a with respect to the transmission axes 18a, 20a of the polarizing plates 18, 20 is 90° (vertical) in observing from either one of the obliquely inclined directions, so that the intensity I of the transmitted light of the viewing-angle control system is kept in the largest intensity. That is, as the transmission axes 18a, 20a of the polarizing plates 18, 20 and the molecular long axis 26ax of the liquid crystal molecule 26a are perpendicular to one another, a display image on the image display panel 11 is observed with high brightness and contrasts regardless of optical effects of the viewing-angle control panel 21.

When the voltage is applied between the electrodes 24, 25 of the viewing-angle control panel 21, the liquid crystal molecule 26a is aligned in such a manner as to incline with respect to the surface of the substrate. In viewing this state from the obliquely inclined directions, the crossing angle θ of the molecular long axis 26ax of the liquid crystal molecule 26a with respect to the transmission axes 18a, 20a of the polarizing plate 18, 20 becomes an angle other than 0° or 90° (parallel or orthogonal), the intensity I of the transmitted light of the viewing angle system becomes small. That is, as the transmission axes 18a, 20a of the polarizing plate 18, 20 and the molecular long axis 26ax of the liquid crystal molecule 26a cross one another at an angle other than a parallel angle or a vertical angle, of the viewing angle system becomes small. That is, as the transmission axes 18a, 20a of the polarizing plate 18, 20 and the molecular long axis 26ax of the liquid crystal molecule 26a cross one another at an angle other than a parallel angle or a vertical angle, a transmittance is reduced. In the liquid crystal display device, as the value of Δnd of the liquid crystal layer is set in such a way that the intensity I of the transmitted light of the viewing-angle control system becomes smallest when the obliquely inclined directions $S_1$ and $S_2$ are inclined to the normal line of the substrate at a predetermined angle of 45°, the screen becomes dark in the observation directions $S_1$ and $S_2$ inclined at 45° with respect to the normal line of the substrate, and a display image on the image display panel 11 becomes unrecognizable.

That is, in viewing from the obliquely inclined directions $S_1$ and $S_2$, the brightness of the screen when the voltage is applied between the electrodes 24, 25 of the viewing-angle control panel 21 changes depending on the value of Δnd of the viewing-angle control panel 21 and tilting angles $\alpha_1$ and $\alpha_2$ of the observation directions $S_1$ and $S_2$ with respect to the front direction. When Δnd of the viewing-angle control panel 21 becomes equal to mλ/2 (in: integer) and when the screen is observed from a direction that the crossing angle θ of the molecular long axis 26ax of the liquid crystal molecule 26a with respect to the transmission axes 18a, 20a of the polarizing plates 18, 20 becomes equal to 45°, the screen becomes darkest. That is, an outgoing light from the image display panel 11 (a linearly polarized light along the transmission axis 18a of the observation side polarizing plate 18) becomes light to which a retardation of a ½ wavelength is given by the liquid crystal element 21 of the viewing-angle control panel and whose polarization plane is rotated at 90°, i.e., a linearly polarized light which is orthogonal to the transmission axis 20a of the viewing-angle control polarizing plate 20. This light is absorbed by the viewing-angle control polarizing plate 20, and the intensity I of the transmitted light of the viewing-angle control system becomes 0, the screen becomes black, so that a display image on the image display panel 11 becomes unrecognizable at all.

Thus, according to the liquid crystal display device 10, it is possible to control the viewing angle of a display image to a wide viewing angle and a narrow viewing angle.

As the liquid crystal display device 10 has the liquid crystal molecules 26a of the liquid crystal layer 26 of the viewing-angle control panel 21 aligned in a uniform aligning state, the aligning treatment of the inner surfaces of the substrates of the viewing-angle control panel is easy, thereby facilitating manufacturing.

As the liquid crystal display device 10 forms each of the electrodes 24, 25 on the inner surfaces of the pair of substrates 22, 23 of the viewing-angle control panel 21 in a single-film shape which corresponds to the entire area of the screen at which the plurality of pixels of the image display panel 11 are arrayed, it is possible to perform a narrow viewing-angle display with high security which darkens the entire screen when the screen is viewed from the obliquely inclined directions $S_1$ and $S_2$.

The liquid crystal display device 10 employs a structure that the viewing-angle control panel 21 comprises the homeotropic alignment type liquid crystal element which has the liquid crystal molecules 26a of the liquid crystal layer 26 aligned substantially vertical to the substrates 22, 23 between the pair of substrates 22, 23, and the inner surfaces of the pair of substrates 22, 23 having the respective electrodes 24, 25 provided thereon are subjected to the aligning treatments which prescribe the falling direction of the liquid crystal molecules 26a when the voltage is applied between the electrodes 24, 25 in a direction parallel to the transmission axes 18a, 20a of the observation side polarizing plate 18 and the viewing-angle control polarizing plate 20 of the image display panel 11. Accordingly, it is possible to perform a wide viewing-angle display whose viewing angle is the same as the viewing angle of the image display panel 11 and a narrow viewing-angle display which narrows the viewing angle of the image display panel 11.

In the liquid crystal display device 10, as the inner surfaces of the pair of substrates 22, 23 of the viewing-angle control panel 21 having the respective electrodes 24, 25 provided thereon are subjected to aligning treatment in a direction substantially parallel to the vertical direction 100 of the screen at which the plurality of pixels of the image display panel 11 are arrayed, it is possible to perform a narrow viewing-angle display which symmetrically narrows the viewing angle of the screen of the image display panel 11 in the horizontal direction.

Second Embodiment

Figure 7:
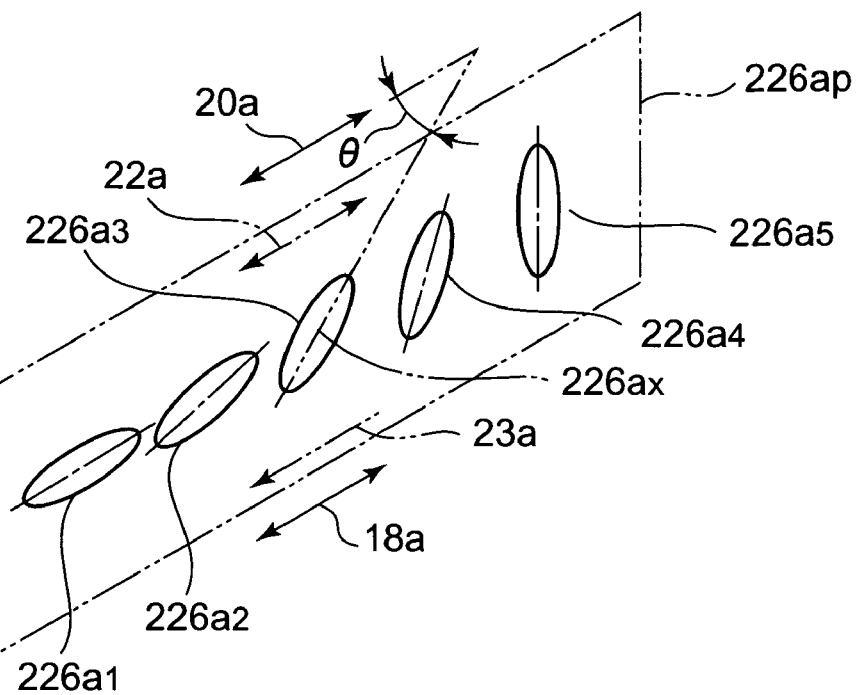
FIG. 7 is an exemplarily diagram illustrating the directions of molecular long axes at a time of applying a voltage and at a time of not applying a voltage to a viewing-angle control element in a case where a homogeneous alignment type liquid crystal element is used as a viewing-angle control panel in a liquid crystal display device according to the second embodiment of the invention.

FIG. 7 exemplarily illustrates a relationship between the transmission axes 18a, 20a of the observation side polarizing plate 18 and the viewing-angle control polarizing plate 20 of the image display panel 11 and the molecular long axes of the liquid crystal molecules of the homogeneous alignment type viewing-angle control panel 21 at the time of applying a voltage and at a time of not applying a voltage in a liquid crystal display device of the second embodiment of the invention. The liquid crystal display device of this embodiment uses a homogeneous alignment type liquid crystal element as the viewing-angle control panel, and only the structure of the viewing-angle control panel differs in comparison with the aforementioned first embodiment. Accordingly, the same parts will be denoted by the same reference numbers as the first embodiment, and the explanations thereof will be omitted.

The viewing-angle control panel of the embodiment is a homogeneous alignment type viewing liquid crystal element which has liquid crystal molecules 226a of a liquid crystal layer 226 aligned substantially in parallel to the surfaces of the substrates 22, 23 in the pair of substrates 22, 23 without twisting them. Formed on each of the inner surfaces of the pair of substrates 22, 23 having the electrode 24 or 25 provided thereon is a homogeneous aligning film subjected to an aligning treatment which has the liquid crystal molecules aligned in a direction parallel to the transmission axes 18a, 20a of the observation side polarizing plate 18 and the viewing-angle control polarizing plate 20 of the image display panel 11.

In this case, when no voltage is applied between the electrodes 24, 25, the liquid crystal molecules 226a of the viewing-angle control panel 21 are aligned substantially horizontal to the surfaces of the substrates 22, 23 in such a way that the molecular long axes 226ax are aligned in aligning treatment directions 22a, 23a of the substrates 22, 23 like a liquid crystal molecule 226a1. When a voltage is applied between the electrodes 24, 25, the liquid crystal molecules 226a are aligned and risen in such a way that angles to the surfaces of the substrates 22, 23 enlarge along with the increment of the applied voltage with the molecular long axes 226ax directed to the aligning treatment directions 22a, 23a of the pair of substrates 22, 23 like liquid crystal molecules 226a2 to 226a5 in FIG. 7.

Also in a case where the homogeneous alignment type viewing-angle control panel 21 is used, when no voltage is applied between the electrodes 24, 25, the viewing-angle control panel 21 allows a light entering from any directions to transmit without giving a retardation, a display image on the image display panel 11 is viewed at a wide viewing angle.

That is, as the liquid crystal molecules 226a are aligned parallel to the surface of the substrate, and the crossing angle θ of the molecular long axes 226ax of the liquid crystal molecules 226a with respect to the transmission axes 18a, 20a of the polarizing plates 18, 20 is 0° (parallel) in viewing from either of the obliquely inclined directions, the intensity I of the transmitted light of the viewing-angle control system is kept in the largest intensity. That is, as the transmission axes 18a, 20a of the polarizing plates 18, 20 and the molecular long axes 226ax of the liquid crystal molecules 226a are in parallel to one another, a display image on the image display panel 11 is observed with high brightness and contrasts regardless of optical effects by the viewing-angle control panel 21.

When a voltage for aligning and rising the liquid crystal molecules 226a in a direction inclined obliquely in the normal line of the surfaces of the substrates 22, 23 is applied between the electrodes 24, 25, the liquid crystal molecules 226a are aligned and inclined with respect to the surface of the substrate. In this state, with respect to an oblique transmitted light in a direction inclined obliquely to the normal line of the substrates 22, 23 among lights transmitted the viewing-angle control panel 21, the crossing angles θ of the molecular long axes 226ax of the liquid crystal molecules 226a to the transmission axes 18a, 20a of the polarizing plates 18, 20 become angles other than 0° or 90° (parallel or orthogonal). Accordingly, the retardation (a retardation that a retardation value to the oblique transmitted light in an angle direction is an integral multiple of a ½ wavelength) is given to the oblique transmitted light by the viewing-angle control panel 21, and the polarization state changes, and the oblique transmitted light is absorbed by the viewing-angle control polarizing plate 20 disposed on an output side of the viewing-angle control panel 21. Accordingly, a display image becomes unrecognizable from a direction inclined obliquely to the normal line of the surfaces of the substrates 12, 13 of the image display panel 11, and the viewing angle of the display image becomes narrow.

Therefore, even if the homogeneous alignment type viewing-angle control panel 21 is used, it is possible to perform a wide viewing-angle display whose viewing angle is the same as that of the image display panel 11 and a narrow viewing-angle display which narrows the viewing angle of the image display panel 11.

As the homogeneous alignment type viewing-angle control panel 21 also has the liquid crystal molecules 226a of the liquid crystal layer 26 aligned in a uniform aligning state, the aligning treatment of the inner surfaces of the substrates of the liquid crystal element 21 of the viewing-angle control panel is easy, thereby facilitating manufacturing.

It is preferable that the pair of substrates 22, 23 should be subjected to aligning treatments in a direction substantially parallel to the vertical direction of the screen at which the plurality of pixels of the image display panel 11 are arrayed for a case where the homogeneous alignment type viewing-angle control panel 21 is used, and this makes it possible to perform a narrow viewing-angle display which narrows the viewing angle in the horizontal direction of the screen of the image display panel 11.

Third Embodiment

Figure 8:
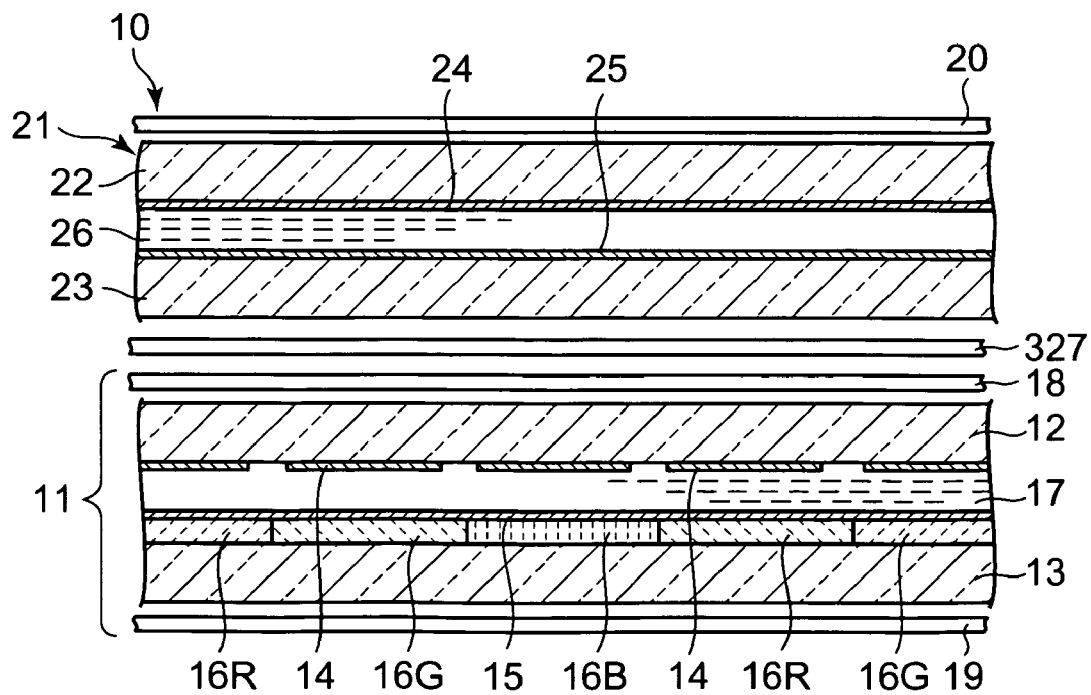
FIG. 8 is a cross-sectional view of a part of a liquid crystal display device according to the third embodiment of the invention.

FIG. 8 is a cross-sectional view illustrating a part of a liquid crystal display device of the third embodiment of the invention. In the liquid crystal display device 10 of this embodiment, another viewing-angle control polarizing plate 327 is disposed between the observation side polarizing plate 18 of the image display panel 11 and the homeotropic alignment type or homogeneous alignment type viewing-angle control panel 21 in such a way that the transmission axis of that viewing-angle control polarizing plate becomes in parallel to the transmission axis of the observation side polarizing plate 18 of the image display panel 11. Other structural portions are the same as those of the first embodiment. Accordingly, the same structural portions will be denoted by the same reference numbers, and the explanations will be omitted.

As the liquid crystal display device 10 of the embodiment has another viewing-angle control polarizing plate 327, the image display panel 11 which has the two polarizing plates 18, 19 and the viewing-angle control system which comprises the viewing-angle control panel 21 and the two viewing-angle control polarizing plate 20, 327 can be fabricated separately. Therefore, the liquid crystal display device 10 can be manufactured by a simple process of putting the viewing-angle control system over the image display panel 11.

In the first to third embodiments, although the viewing-angle control panel 21 and the viewing-angle control polarizing plates 20, 327 are disposed on the observation side of the image display panel 11, the viewing-angle control panel 21 and the viewing-angle control polarizing plates 20, 327 may be disposed on a side opposite to the observation side of the image display panel 11, and a light entering from the opposite side of the observation side may be output in such a manner as to transmit the viewing-angle control panel 21 and the viewing-angle control polarizing plates 20, 327.

The type of the viewing-angle control panel 21 is not limited to the aforementioned homeotropic alignment type or homogeneous alignment type. The viewing-angle control panel 21 may comprise a pair of substrates opposite to each other with a gap therebetween, electrodes provided on the opposing inner surfaces of the substrates, and a liquid crystal layer sealed between the pair of substrates, and whose liquid crystal molecules are aligned in a uniform aligning state, and have an optical characteristic which has the liquid crystal molecules of the liquid crystal layer aligned in a direction obliquely inclined with respect to the normal line of the surfaces of the substrates and gives a retardation that is an integral multiple of a ½ wavelength to an oblique transmitted light inclined with respect to the normal line at a predetermined angle when a voltage is applied between the electrode.

In the aforementioned embodiments, each of the electrodes 24, 25 on the inner surfaces of the pair of substrates 22, 23 of the viewing-angle control panel 21 is formed in a single-film shape which corresponds to the entire area of the screen at which the plurality of pixels of the image display panel 11 are arrayed, but may be formed in a mosaic-like shape, a stripe shape, or a shape of a character or a marking.

The liquid crystal display device of the invention is not limited to the cellular phone device illustrated in FIG. 1. The invention is applicable to other electronic devices having a display section.

Various embodiments and changes may be made thereunto without departing from the broad spirit and scope of the invention. The above-described embodiments are intended to illustrate the present invention, not to limit the scope of the present invention. The scope of the present invention is shown by the attached claims rather than the embodiments. Various modifications made within the meaning of an equivalent of the claims of the invention and within the claims are to be regarded to be in the scope of the present invention.

This application is based on Japanese Patent Application No. 2005-177927 filed on Jun. 17, 2005 and including specification, claims, drawings and summary. The disclosure of the above Japanese Patent Application is incorporated herein by reference in its entirety.

What is claimed is:

1. A liquid crystal display device comprising:
   (i) an image display panel comprising:
      a view-side substrate and an opposite-side substrate facing each other with a predetermined gap therebetween,
      first and second electrodes provided on at least one of opposing inner surfaces of the view-side substrate and the opposite-side substrate, and forming a plurality of pixels,
      a liquid crystal layer sealed between the view-side substrate and the opposite-side substrate, and
      a pair of polarizing plates sandwiching the view-side substrate and the opposite-side substrate,
      wherein the image display panel controls light transmission for each of the plurality of pixels by applying a voltage according to image data between the first and second electrodes to display an image; and
   (ii) a viewing-angle control panel comprising:
      a liquid crystal element comprising:
         a pair of substrates disposed on an external surface side of one of the polarizing plates of the image display panel and facing each other with a predetermined gap therebetween,
         electrodes respectively provided on opposing inner surfaces of the substrates, and
         a liquid crystal layer which is sealed between the pair of substrates such that liquid crystal molecules positioned near each of the pair of substrates are aligned uniformly at a substantially constant angle with respect to surfaces of the substrates, and which gives a retardation that is an integral multiple of a substantially ½ wavelength to an oblique transmitted light in a direction inclined at a predetermined angle with respect to a normal line of the surface of at least one of the substrates, when a voltage for aligning the liquid crystal molecules of the liquid crystal layer in a direction inclined obliquely with respect to the normal line at a predetermined angle is applied between the electrodes; and
      a viewing-angle control polarizing plate disposed outside the liquid crystal element such that an optical axis of the viewing-angle control polarizing plate is directed in a direction parallel to optical axes of the polarizing plates of the image display panel.

2. The liquid crystal display device according to claim 1, wherein each of the electrodes on the inner surfaces of the pair of substrates of the viewing-angle control panel is a single-film electrode corresponding to an entire region of a screen at which the plurality of pixels of the image display panel are arrayed.

3. The liquid crystal display device according to claim 1, wherein the liquid crystal element of the viewing-angle control panel comprises a homeotropic alignment type liquid crystal element comprising the liquid crystal molecules of the liquid crystal layer aligned substantially vertical to the surface of at least the substrate between the pair of substrates, and
   wherein each of the inner surfaces of the pair of substrates having the electrodes provided thereon is subjected to an aligning treatment which prescribes a falling direction of the liquid crystal molecules when the voltage is applied between the electrodes in a direction parallel to the optical axes of one of the polarizing plates of the image display panel and the viewing-angle control polarizing plate.

4. The liquid crystal display device according to claim 3, wherein a homeotropic aligning film for aligning the liquid crystal molecules substantially vertical to the surface of at least the substrate between the pair of substrates is formed on each of the inner surfaces of the pair of substrates of the viewing-angle control panel which have the electrode provided thereon.

5. The liquid crystal display device according to claim 4, wherein the homeotropic aligning film is subjected to the aligning treatment in a direction substantially parallel to a vertical direction of a screen at which the plurality of pixels of the image display panel are arrayed.

6. The liquid crystal display device according to claim 1, wherein the liquid crystal element of the viewing-angle control panel comprises a homogeneous alignment type liquid crystal element comprising the liquid crystal molecules of the liquid crystal layer untwisted and aligned substantially parallel to the surface of at least the substrate between the pair of substrates, and
wherein each of the inner surface of the pair of substrates having the electrodes provided thereon is subjected to an aligning treatment which has the liquid crystal molecules aligned substantially parallel to the optical axes of one of the polarizing plates of the image display panel and the viewing-angle control polarizing plate.

7. The liquid crystal display device according to claim 6, wherein a homogeneous aligning film for aligning the liquid crystal molecules substantially parallel to the surface of at least the substrate between the pair of substrates is formed on each of the inner surfaces of the pair of substrates of the viewing-angle control panel which have the electrodes provided thereon.

8. The liquid crystal display device according to claim 7, wherein the homogeneous aligning film is subjected to the aligning treatment in a direction substantially parallel to a vertical direction of a screen at which the plurality of pixels of the image display panel are arrayed.

9. The liquid crystal display device according to claim 1, wherein the viewing-angle control panel comprises a second viewing-angle control polarizing plate disposed between one of the polarizing plates of the image display panel and the viewing-angle control panel such that a transmission axis of the second viewing-angle control polarizing plate is in parallel to the optical axis of the one of the polarizing plates of the image display panel.

10. The liquid crystal display device according to claim 1, wherein the inner surfaces of the pair of substrates of the viewing-angle control panel are subjected to an aligning treatment in a direction substantially parallel to a vertical direction of a screen at which the plurality of pixels of the image display panel are arrayed.

11. The liquid crystal display device according to claim 1, wherein the liquid crystal layer of viewing-angle control panel gives the retardation to an oblique transmitted light in a direction inclined at an angle of 30° to 60° with respect to the normal line when the voltage for aligning the liquid crystal molecules of the liquid crystal layer in the direction inclined obliquely with respect to the normal line at the predetermined angle is applied between the electrodes.

12. The liquid crystal display device according to claim 1, wherein the liquid crystal layer of the viewing-angle control panel gives the retardation to an oblique transmitted light in a direction inclined at an angle of substantially 45° with respect to the normal line when a voltage for aligning the liquid crystal molecules of the liquid crystal layer in a direction inclined obliquely with respect to the normal line at an angle of 45° is applied between the electrodes.

13. A liquid crystal display device comprising:
(i) an image display panel which comprises:
   a view-side substrate and an opposite-side substrate facing each other with a gap therebetween,
   first and second electrodes provided on at least one of opposing inner surfaces of the view-side substrate and the opposite-side substrate forming a plurality of pixels,
   a liquid crystal layer sealed between the view-side substrate and the opposite-side substrate, and
   a pair of polarizing plates sandwiching the view-side substrate and the opposite-side substrate,
   wherein the image display panel controls light transmission for each of the plurality of pixels by applying a voltage according to image data between the first and second electrodes to display an image;
(ii) a viewing-angle control panel comprising:
   a liquid crystal element which comprises:
      a pair of substrates disposed on an external surface side of one of the polarizing plates of the image display panel and facing each other with a gap therebetween,
      electrodes respectively provided on opposing inner surfaces of the substrates, and
      a liquid crystal layer which is sealed between the pair of substrates such that liquid crystal molecules positioned near each of the pair of substrates are aligned uniformly at a substantially constant angle with respect to surfaces of the substrates, and which gives a retardation that is an integral multiple of a substantially ½ wavelength to an oblique transmitted light in a direction inclined at a predetermined angle with respect to a normal line of the surface of at least one of the substrates, when a voltage for aligning the liquid crystal molecules of the liquid crystal layer in a direction inclined obliquely with respect to the normal line at a predetermined angle is applied between the electrodes; and
   a viewing-angle control polarizing plate disposed outside the liquid crystal element such that an optical axis of the viewing-angle control polarizing plate is directed in a direction parallel to optical axes of the polarizing plates of the image display panel; and
(iii) a viewing-angle control circuit which is connected to the viewing-angle control panel, and which supplies the voltage for aligning the liquid crystal molecules of the liquid crystal layer in the direction inclined obliquely with respect to the normal line between the electrodes of the viewing-angle control panel.

14. The liquid crystal display device according to claim 13, further comprising:
a display drive circuit which drives the image display panel, and
a control circuit to which a display data signal and a viewing angle selection signal are supplied, and which controls the display drive circuit and operation of the viewing-angle control circuit in accordance with the viewing angle selection signal.

15. The liquid crystal display device according to claim 13, wherein the liquid crystal layer of viewing-angle control panel gives the retardation to an oblique transmitted light in a direction inclined at an angle of 30° to 60° with respect to the normal line when a voltage for aligning the liquid crystal molecules of the liquid crystal layer in a direction inclined obliquely with respect to the normal line at an angle of 45° is applied between the electrodes.

16. The liquid crystal display device according to claim 13, wherein the viewing-angle control panel has a homeotropic aligning film formed, for having the liquid crystal molecules aligned substantially vertical to the surface of the at least one substrate between the pair of substrates, on each of the inner surfaces of the pair of substrates which have the electrode provided thereon, and wherein the homeotropic aligning film is subjected to an aligning treatment which prescribes a falling direction of the liquid crystal molecules when the voltage is applied between the electrodes in a direction parallel to the optical axes of one of the polarizing plates of the image display panel and the viewing-angle control polarizing plate.

17. The liquid crystal display device according to claim 13, wherein the viewing-angle control panel has a homogeneous aligning film formed, for having the liquid crystal molecules aligned substantially parallel to the surface of the at least one substrate between the pair of substrates, on each of the inner surfaces of the pair of substrates having the electrode provided thereon, and wherein the homogeneous aligning film is subjected to an aligning treatment which prescribes a falling direction of the liquid crystal molecules when the voltage is applied between the electrodes in a direction parallel to the optical axes of one of the polarizing plates of the image display panel and the viewing-angle control polarizing plate.

18. An electronic device comprising a liquid crystal display device comprising:

(i) an image display panel comprising:

a view-side substrate and an opposite-side substrate facing each other with a gap therebetween, first and second electrodes provided on at least one of opposing inner surfaces of the view-side substrate and the opposite-side substrate forming a plurality of pixels, a liquid crystal layer sealed between the view-side substrate and the opposite-side substrate, and a pair of polarizing plates sandwiching the view-side substrate and the opposite-side substrate, wherein the image display panel controls light transmission for each of the plurality of pixels by applying a voltage according to image data between the first and second electrodes to display an image; and (ii) a viewing-angle control panel comprising:

a liquid crystal element comprising:

a pair of substrates disposed on an external surface side of one of the polarizing plates of the image display panel and facing each other with a gap therebetween, electrodes provided on both inner surfaces of the substrates, and a liquid crystal layer which is sealed between the pair of substrates such that liquid crystal molecules positioned near each of the pair of substrates are aligned uniformly at a substantially constant angle with respect to surfaces of the substrates, and which gives a retardation that is an integral multiple of a substantially ½ wavelength to an oblique transmitted light in a direction inclined at a predetermined angle with respect to a normal line of the surface of at least one of the substrates, when a voltage for aligning the liquid crystal molecules of the liquid crystal layer in a direction inclined obliquely with respect to the normal line at a predetermined angle is applied between the electrodes; and a viewing-angle control polarizing plate disposed outside the liquid crystal element such that an optical axis of the viewing-angle control polarizing plate is directed in a direction parallel to optical axes of the polarizing plates of the image display panel.

19. The electronic device according to claim 18, wherein the liquid crystal display device is arranged in accordance with a display section of the electronic device, and wherein the inner surfaces of the pair of substrates of the viewing-angle control panel of the liquid crystal display device having the electrodes provided thereon are subjected to an aligning treatment in a direction substantially parallel to a vertical direction of the electronic device in a use state.

20. The electronic device according to claim 18, further comprising:

a viewing-angle control circuit which is connected to the viewing-angle control panel, and which supplies the voltage for aligning the liquid crystal molecules of the liquid crystal layer in the direction inclined obliquely to the normal line between the electrodes of the viewing-angle control panel, and a viewing angle selection section which supplies a viewing angle selection signal causing the viewing-angle control circuit to select one of a wide viewing angle and a narrow viewing angle.

* * * * *